United States Patent [19]

Suzuki et al.

[11] Patent Number: 4,729,026
[45] Date of Patent: Mar. 1, 1988

[54] AUTO-PEDESTAL LEVEL CLAMP CIRCUIT

[75] Inventors: Fuminori Suzuki, Tokorozawa; Kiyoshi Kamiya, Higashikurume, both of Japan

[73] Assignee: Citizen Watch Co., Ltd., Tokyo, Japan

[21] Appl. No.: 865,142

[22] Filed: May 20, 1986

[30] Foreign Application Priority Data

| May 21, 1985 | [JP] | Japan | 60-108524 |
| Jun. 11, 1985 | [JP] | Japan | 60-126771 |
| Jul. 19, 1985 | [JP] | Japan | 60-159532 |
| Aug. 30, 1985 | [JP] | Japan | 60-191754 |

[51] Int. Cl.[4] .................... H04N 5/18; H04N 5/20
[52] U.S. Cl. .................... 358/168; 358/172
[58] Field of Search ............ 358/168, 166, 172, 39, 358/171

[56] References Cited

U.S. PATENT DOCUMENTS

| 4,013,833 | 3/1977 | Zimmerman | 358/168 |
| 4,369,466 | 1/1983 | Matsuzaki | 358/172 |
| 4,403,254 | 9/1983 | Okada | 358/172 |
| 4,473,846 | 9/1984 | Mackereth | 358/172 |

Primary Examiner—Tommy P. Chin
Attorney, Agent, or Firm—Rogers, Howell, Moore & Haferkamp

[57] ABSTRACT

An auto-pedestal level clamp circuit, which clamps a pedestal level of a television signal input through a DC blocking capacitor using a pedestal level clamp switch to automatically adjust the pedestal level, includes a level detecting circuit for detecting a luminance signal level of the television signal, and an A/D converter for judging a luminance of a frame based on the output from the level detecting circuit. The level detecting circuit includes first and second gates, first and second switches controlled by the first and second gates, and a smoothing circuit. The pedestal level of the television signal input to the level detecting circuit through the pedestal level clamp switch is adjusted based on an integral potential level of the output from the A/D converter.

11 Claims, 12 Drawing Figures

FIG. 1

PRIOR ART

AUTO-PEDESTAL LEVEL CLAMP CIRCUIT

BACKGROUND OF THE INVENTION

1. Field of the Invention

The present invention relates to an improvement in an auto-pedestal level clamp circuit in an automatic luminance control circuit of a television.

2. Description of the Prior Art

In an automatic luminance control circuit of a television, since pedestal level varies depending on the video signal, an auto-pedestal level clamp circuit is adopted to forcibly clamp the pedestal level at a given level.

Figure 1:
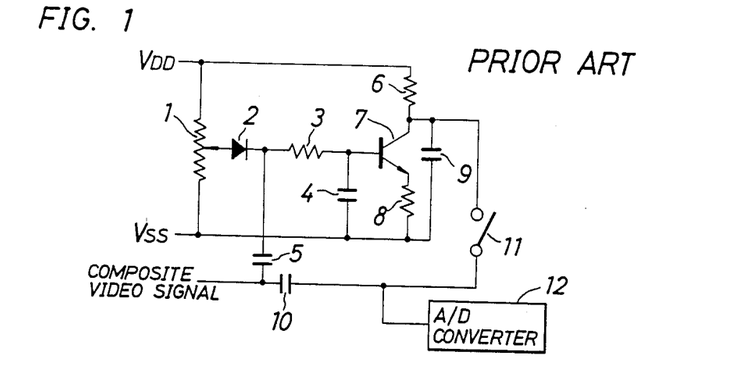
FIG. 1 is a block diagram of a conventional auto-pedestal level clamp circuit.

FIG. 1 shows a conventional auto-pedestal clamp circuit. Referring to FIG. 1, reference numeral 1 denotes a control for generating a divided voltage of a positive power source voltage (to be referred to as $V_{DD}$ hereinafter) and a negative power source voltage (to be referred to as $V_{SS}$ hereinafter); 2, a diode; 4, 5, 9, and 10, capacitors; 3, 6, and 8, resistors; 7, a transistor; 11, a pedestal level clamp switch which is turned on or off in response to a pedestal level clamp pulse; and 12, an A/D converter for quantizing the composite video signal.

Referring to FIG. 1, the diode 2 connected to an intermediate tap of the control 1 clamps a composite video signal passing through the capacitor 5, and the clamped signal is smoothed by the resistor 3 and the capacitor 4. The collector potential of the transistor 7 varies depending on the change in smoothed potential, thus charging or discharging the capacitor 9. More specifically, in a bright frame (i.e., when a luminance signal in the composite video signal is high), since the base potential of the transistor 7 increases, the collector current increases accordingly, and the capacitor 9 discharges, thus decreasing the potential of the capacitor 9. On the other hand, in a dark frame (when the luminance signal is low), the capacitor 9 is charged, and its potential increases.

Figure 2A:
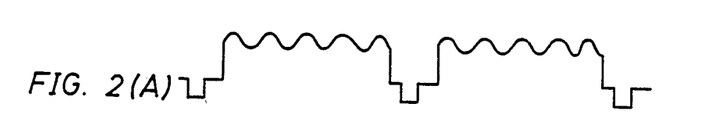
FIG. 2(A) is a timing chart of a composite television video signal.
Figure 2B:
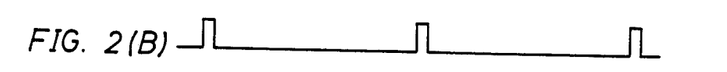
FIG. 2(B) is a timing chart of a pedestal level clamp pulse.
Figure 2C:
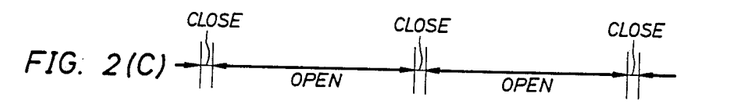
FIG. 2(C) is a timing chart of an ON/OFF timing of a pedestal level clamp switch.

FIGS. 2(A) to 2(C) are timing charts showing the relationship between the pedestal level clamp pulse and the ON/OFF operation of the pedestal level clamp switch with respect to the composite video signal during about 2H (H: horizontal period) of the composite video signal. FIG. 2(A) shows the composite video signal, and FIG. 2(B) shows the pedestal clamp pulse which goes to HIGH level during an interval from the leading edge of a horizontal sync signal to the luminance signal in the composite video signal from which DC components are removed (this interval will be referred to as a back porch hereinafter).

Referring to FIG. 2(C), "close" indicates the state wherein the two ends of the pedestal level clamp switch are enabled, and "open" indicates the state wherein they are disabled. Since the "close" timing coincides with the HIGH level interval of the pedestal clamp pulse in FIG. 2(B), charges are accumulated on or discharged from a DC blocking capacitor for the composite video signal, so that the voltage during the back porch (to be referred to as a pedestal level hereinafter) is equal to that at the other end of the pedestal level clamp switch.

For example, when image contrast is low as in the time-division drive display of a liquid-crystal television, multi-gradation display is not easily realized. In addition, when the dynamic range of gradation display is adjusted in a bright frame, this results in poor gradation in a dark frame. For this reason, the auto-pedestal level clamp circuit is necessary for enabling averaged display by narrowing the dynamic range determined by an A/D converter and the like, so that the pedestal level is decreased in a bright frame to display many bright image portions and increased in a dark frame to display many dark image portions.

However, in order to obtain a satisfactory display frame with the circuit shown in FIG. 1, the control 1 in FIG. 1 must be finely adjusted, resulting in increased number of steps and hence increased cost. In FIG. 1, since the capacitors 4, 5, and 9 have a capacitance of 0.1 to several tens of $\mu F$, they cannot be integrated as an IC and must be separately arranged, thus interfering with cost reduction and compact circuit design. In addition, since the output from the A/D converter in FIG. 1 is not fed back for setting the pedestal level, a time constant for circuit constituents must be accurately selected, thus narrowing the application range with respect to the amplitude of the composite video signal.

SUMMARY OF THE INVENTION

It is an object of the present invention to provide a compact auto-pedestal level clamp circuit which is free from the above drawbacks and has a wide application range.

It is another object of the present invention to provide a low-cost auto-pedestal level clamp circuit which removes the necessity for fine adjustment of pedestal level.

DETAILED DESCRIPTION OF THE PREFERRED EMBODIMENTS

Figure 3:
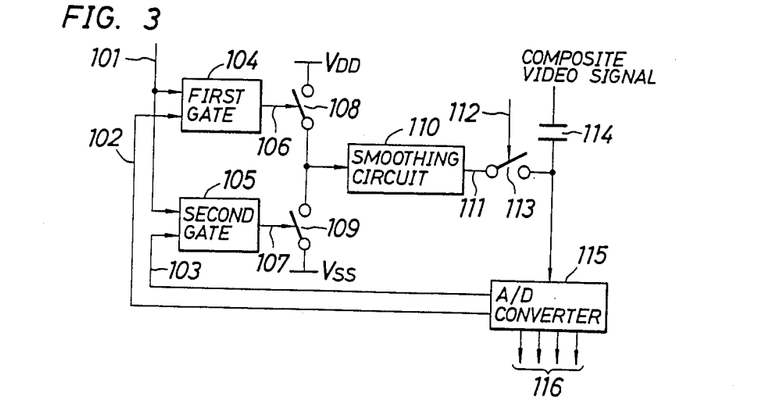
FIG. 3 is a block diagram of an auto-pedestal level clamp circuit according to a first embodiment of the present invention.

FIG. 3 is a block diagram of an auto-pedestal level clamp circuit according to an embodiment of the present invention. Arrows in FIG. 3 indicate propagating directions of signals. Reference numeral 101 denotes a luminance signal period signal indicating a period in a composite video signal during which a luminance signal is present; 103 and 102, most and least significant comparator outputs from an A/D converter, respectively; 104, a first gate receiving the least significant comparator output 102 from the A/D converter and the luminance period signal 101 to synthesize a first switch control signal; 105, a second gate receiving the most significant comparator output 103 from the A/D converter and the luminance period signal 101 to synthesize a second switch control signal; 106 and 107, outputs form the first and second gates 104 and 105 for controlling the first and second switches, respectively; 108 and 109, first and second switches each having one end connected to $V_{DD}$ and $V_{SS}$, respectively; 110, a smoothing circuit connected to the node between the first and second switches 108 and 109; 111, an output from the smoothing circuit 110; 112, a pedestal level clamp pulse; 113, a pedestal level clamp switch connected to the output 111 from the smoothing circuit 110; 114, a DC blocking capacitor for removing DC components of the composite video signal; 115, a 4-bit A/D converter consisting of a plurality (e.g., 15, if 16 gray levels) of comparators, for receiving the composite video signal to which a DC bias is added by the pedestal level clamp switch 113 to produce the least and most significant comparator outputs 102 and 103; and 116, 4-bit quantized outputs from the A/D converter 115.

Referring to FIG. 3, when a low luminance signal level corresponding to a dark portion of a display image does not exceed a threshold value of the least significant comparator of the A/D converter 115 (to be referred to as an underflow hereinafter), the first gate 104 causes the first switch 108 to be closed, thus connecting the smoothing circuit 110 to voltage $V_{DD}$. On the contrary, when a high luminance signal level corresponding to a bright portion of a display image exceeds the threshold value of the most significant comparator of the A/D converter 115 (to be referred to as an overflow hereinafter), the second gate 105 causes the second switch 109 to be closed, thus connecting the smoothing circuit 110 to voltage $V_{SS}$. When the luminance signal level neither underflows nor overflows, and during a non-display period (e.g., a vertical blanking period or horizontal blanking period), the first and second gates 104 and 105 open the first and second switches 108 and 109 and supply no input to the smoothing circuit 110.

In the embodiment shown in FIG. 3, when there are many underflow levels in a dark frame, since the smoothing circuit 110 is frequently connected to the $V_{DD}$, the output 111 from the smoothing circuit 110 is increased, and the DC bias of the composite video signal, which is input to the A/D converter 115 when the pedestal level clamp switch 113 is closed, is also increased, thus forming a feedback loop to brighten the display image. On the contrary, when there are many overflow levels in a bright frame, the DC bias is decreased and a feedback loop is formed to darken the display image. As a result, since the DC bias of the composite video signal, which is input to the A/D converter 115, is stabilized so that areas of underflow and overflow regions are equal to each other, the contrast of a display apparatus can be effectively used.

Figures 4, 5:
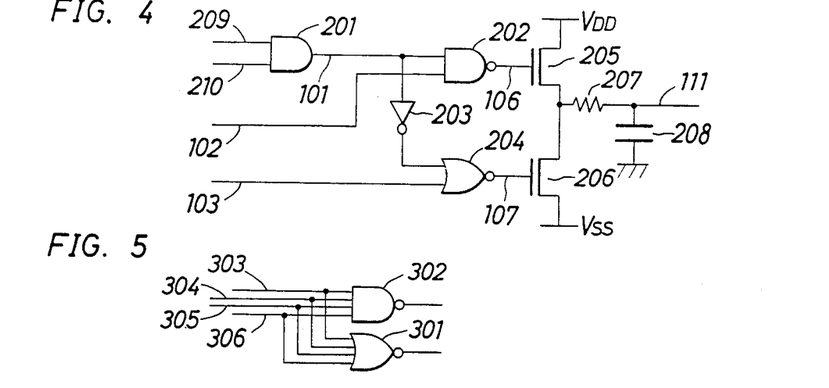
FIG. 4 is a circuit diagram of a main part of the circuit of the first embodiment shown in FIG. 3.
FIG. 5 is a circuit diagram of a luminance signal level detector of the first embodiment.

FIG. 4 is a circuit of the first and second gates 104 and 105, the switches 108 and 109, and the smoothing circuit 110 shown in FIG. 3 and a control circuit for producing a luminance signal period signal 101 shown in FIG. 3 and controlling the operation during the non-display period. The same reference numerals in FIG. 4 denote the same parts as in FIG. 3. Reference numeral 201 denotes an AND gate for controlling the first and second switches 108 and 109 to be opened during the non-display period; 202, a NAND gate serving as the first gate; 203 and 204, an inverter and a NOR gate, which constitute the second gate; 205, a P-MOSFET used as the first switch; 206, an N-MOSFET used as the second switch; 207 and 208, a resistor and a capacitor, which constitute a smoothing circuit; and 209 and 210, signals which go to LOW level during the vertical and horizontal blanking periods. When the signals 209 and 210 go to LOW level, since the outputs from the NAND gate 202 and the NOR gate 204 respectively go to HIGH and LOW levels, the P- and N-MOSFETs 205 and 206 are disabled. This state corresponds to a case wherein the first and second switches in FIG. 3 are open. In a dark, underflow display portion, since the outputs 102 and 103 from the least and most significant comparators of the A/D converter 115 go to HIGH level, the outputs from the NAND gate 202 and the NOR gate 204 go to LOW level, thus enabling the P-MOSFET 205 to connect the smoothing circuit and the $V_{DD}$. In a bright, overflow display portion, the outputs 102 and 103 from the least and most significant comparators of the A/D converter go to LOW level, and the N-MOSFET 206 is enabled. When the luminance signal level neither underflows nor overflows, since the outputs 102 and 103 from the least and most significant comparators of the A/D converter respectively go to LOW and HIGH levels, the N- and P-MOSFETs 205 and 206 are disabled.

FIG. 5 is a circuit diagram of another circuit when quantized outputs from the A/D converter are used as first and second luminance signal level detectors. Referring to FIG. 5, reference numeral 301 denotes a NOR gate; 302, a NAND gate; and 303, 304, 305, and 306, outputs from the 4-bit A/D converter. In the case of underflow, since all the quantized outputs 303 to 306 from the A/D converter go to LOW level, the outputs from the NAND gate 302 and the NOR gate 301 go to LOW level. In the case of overflow, all the quantized outputs 303 to 306 from the A/D converter go to HIGH level, and the outputs from the NAND gate 302 and the NOR gate 301 go to HIGH level. When neither underflow nor overflow occurs, since the outputs from the NAND gate 302 and the NOR gate 301 respectively go to HIGH and LOW levels, they can serve the same role as the outputs 103 and 102 from the least and most significant comparators of the A/D converter in FIG. 4.

Note that the first and second switches can be bipolar transistors, and the present invention can be applied to a CRT display type television. In order to reduce power consumption, the first and second switches can be operated during every few Hs.

Figure 6:
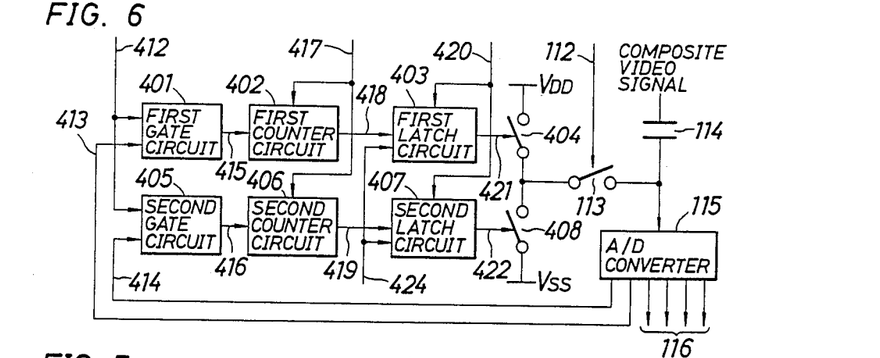
FIG. 6 is a block diagram of an auto-pedestal level clamp circuit according to a second embodiment of the present invention.

FIG. 6 is a block diagram of an auto-pedestal clamp circuit according to a second embodiment of the present invention. Referring to FIG. 6, arrows indicate propagating directions of signals, and the same reference numerals therein denote the same parts as in FIG. 3. Reference numeral 401 denotes a first gate circuit for making a "dark" judgement based on the output from a luminance signal level detector when a luminance signal level is low, to pass continuously input clocks (indicated by 412) therethrough; 402, a first counter circuit for counting the clocks (indicated by 415) passing through the first gate circuit 401 during a specific period for judging total level of the luminance signal; 403, a first latch circuit for latching an "overall bright" or "overall dark" judgement indicated by 418 as the output from the first counter circuit 402 when the specific period is completed; 404, a first switch which is connected to a DC potential $V_{DD}$ and is closed when the output (indicated by 421) from the first latch circuit 403 indicates an "overall dark" judgement; 405, a second gate circuit for making a "bright" judgement based on the output from the luminance signal level detector when the luminance signal level is high, to pass the clocks 412 therethrough; 406, a second counter circuit for counting the clocks passing through the gate circuit 405 (indicated by 416) during the specific period; 407, a second latch circuit for latching an "overall bright" or "overall dark" judgement as the output from the second counter circuit 406 (indicated by 419) when the specific period is completed; 408, a second switch which is connected to a DC potential $V_{SS}$ and is closed when the output from the second latch circuit 407 (indicated by 422) indicates an "overall bright" judgement; 113, a pedestal level clamp switch connected to the first and second switches 404 and 408; 114, a DC blocking capacitor for a composite video signal; 115, a 4-bit A/D converter, whose input is connected to the pedestal level clamp switch 113 and the DC blocking capacitor 114; 413 and 414, quantized outputs from the A/D converter 115 used as the luminance signal level detectors, or internal comparator outputs from the A/D converter 115; 417, reset signals supplied to the first and second counter circuits 402 and 406 when the specific period begins; and 420, a signal input to the first and second latch circuits 403 and 407 for opening the first and second switches 404 and 408 during a non-display period (e.g., the vertical blanking period).

In addition, reference numeral 112 denotes a pedestal level clamp pulse; 424, a signal for fetching the outputs 418 and 419 from the first and second counter circuits 402 and 406 by the first and second latch circuits 403 and 407 when the specific period is completed; and 116, 4-bit quantized outputs from the A/D converter 115.

Referring to FIG. 6, when the luminance signal includes many underflow portions and indicates an "overall dark" judgement, the period during which the clocks 412 can pass through the first gate 401 is prolonged. When the outpus 415 from the gate circuit 401 input to the first counter circuit 402 exceed a count value set, in advance, for an "overall dark" judgement during the specific period, the first counter circuit 402 makes an "overall dark" judgement, and the result 418 is fetched by the first latch circuit 403 when the specifc period is completed.

When the luminance signal indicates an "overall dark" judgement, the period during which the clocks 412 can pass through the second gate circuit 405 is shortened, and the outputs 416 from the second gate circuit 405 input to the second counter circuit 406 cannot exceed a count value set, in advance, for making an "overall bright" judgement during the specific period. The second counter circuit 406 thus makes an "overall dark" judgement, and the result 419 is fetched by the second latch circuit 407 when the specific period is completed.

As a result, during the next specific period, the first switch 404 is closed and the second switch 408 is opened by the outputs 421 and 422 from the first and second latch circuits 403 and 407, and the pedestal level clamp switch 113 is closed. In this case, charges flow into the DC blocking capacitor 114 due to charging characteristics determined by the resistances of the switches 404 and 113 and the capacitance of the capacitor 114, thereby increasing the pedestal level of the composite video signal supplied to the A/D converter 115.

Referring to FIG. 6, when the luminance signal includes many overflow portions and indicates an "overall bright" judgement, the clocks 412 can pass through the first gate circuit 401 for only a short period. However, since they can pass through the second gate circuit 406 for a long period, the clock outputs 415 of the first gate circuit 401 are below the preset count value of the first counter circuit 402 for making an "overall dark" judgement during the specific period, and the first counter circuit 402 then makes an "overall bright" judgement. In addition, since the clock outputs 416 exceed the preset count value of the second counter circuit 406 for making an "overall bright" judgement, the second counter circuit 406 makes an "overall bright" judgement. The respective results 418 and 419 are fetched by the first and second latch circuits 403 and 407 when the specific period is completed.

As a result, when the first switch 404 is opened, the second switch 408 is closed, and the pedestal level clamp switch 113 is closed during the next specific period, charges are discharged from the DC blocking capacitor 114 due to discharging characteristics determined by the circuit constant, thus decreasing the pedestal level of the composite video signal input to the A/D converter 115.

In FIG. 6, in a neutral state wherein the luminance signal level is neither high nor low, since not so many of the clock outputs 415 and 416 pass through the first and second gate circuits 401 and 405, the first counter circuit 402 makes an "overall bright" judgement, while the second counter circuit 406 makes an "overall dark" judgement when the specific period is completed. The output results 418 and 419 are fetched by the first and second latch circuits 403 and 407, respectively.

As a result, the first and second switches 404 and 408 are opened during the next specific period, thus disabling pedestal level control.

When both the first and second counter circuits 402 and 406 make an "overall dark" judgement during the preceding specific period, the pedestal level of the composite video signal input to the A/D converter 115 is slightly increased during the next specific period, and the luminance signal level input thereto is also increased accordingly, thus forming a feedback loop to approach a neutral state.

On the contrary, when both of the circuits 402 and 406 make an "overall bright" judgement, the feedback loop is formed to approach the neutral state.

In the second embodiment, when a smoothing circuit consisting of a resistor and a capacitor is connected to the input side of the pedestal clamp switch 113, the feedback operation can be smoothed.

As a result, since variations in pedestal level can be moderated, the second embodiment is particularly effective with respect to small-amplitude composite video signals.

Note that when a control function is added to the first and second latch circuits so that the close timing of the first and second switches coincides with that of the pedestal level clamp switch, the pedestal level clamp switch can be omitted.

This can be considered a modification of this embodiment of the present invention.

The clocks passing through the first and second gate circuits can be sampling clocks from the A/D converter or inverted clocks therefrom.

In order to finely adjust the pedestal level clamp function, a variable or fixed resistor is connected between the pedestal level clamp switch 113 and the node between the first and second switches 404 and 408, to control the DC potential (e.g., $V_{DD}$ or $V_{SS}$). In addition, when temperature characteristics of a liquid-crystal panel or the like are also taken into consideration, the above resistor can be selected so that a change in resistance thereof due to temperature corresponds to an optimal adjustment value. The circuit of this embodiment can be applied to a CRT display type television.

Figure 7:
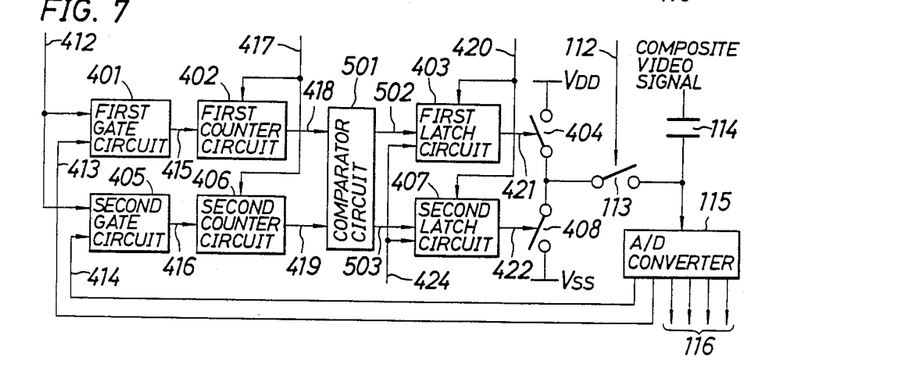
FIG. 7 is a block diagram of an auto-pedestal level clamp circuit according to a third embodiment of the present invention.

FIG. 7 is a block diagram of an auto-pedestal clamp circuit according to a third embodiment of the present invention. Referring to FIG. 7, arrows indicate propagating directions of signals, and the same reference numerals therein denote the same parts as in FIG. 6.

This embodiment is similar to that shown in FIG. 6, except that a comparator 501 for comparing count values from first and second counter circuits 402 and 406 is provided.

The operation of the circuit of this embodiment will now be described. First and second counter circuits 402 and 406 are reset when a specific period begins. When a luminance signal during the specific period includes many underflow portions, the number of clocks 412 which can pass through a first gate circuit 401 is increased, and the number passing through a second gate circuit 405 is decreased. The comparator 501 then compares count outputs 418 and 419 from the first and second counter circuits 402 and 406 when the specific period is completed. A first latch circuit 403 fetches the result "too dark", and a second latch circuit 406 fetches the result "not too bright". When a first switch 404 is closed and a pedestal clamp switch 113 is also closed during the next specific period, positive charges flow into a DC blocking capacitor 114 based on a time constant determined by the resistance of the circuit and the capacitance of the capacitor 114, thus increasing the pedestal level of the composite video signal input to an A/D converter 115.

In FIG. 7, when the first and second counter circuits 402 and 406 are reset when the specific period begins, and the luminance signal includes many overflow portions during the specific period, the number of pulses 412 which can pass through the second gate circuit 405 is increased, while that through the first gate circuit 401 is decreased. The comparator 501 then compares the count outputs 418 and 419 from the first and second counter circuits 402 and 406 when the specific period is completed. The second latch circuit 407 fetches the result "too bright", and the first latch circuit 403 fetches the result "not too dark". When the second switch 408 is closed and the pedestal level clamp switch 113 is closed by the output from the second latch circuit 407 during the next specific period, positive charges are discharged from the DC blocking capacitor 114 in accordance with the time constant of the circuit, thus decreasing the pedestal level of the composite video signal input to the A/D converter 115.

When the luminance signal evenly includes the underflow and overflow portions during the specific period, the comparator 501 judges within its precision range that the count outputs 418 and 419 from the first and second counter circuits 402 and 406 are the same when the specific period is completed, and the first and second latch circuits 403 and 407 respectively fetch the results "not too dark" and "not too bright" from the comparator 501. During the next specific period, both the first and second switches 404 and 408 are opened, and the pedestal level of the composite video signal input to the A/D converter 115 remains unchanged.

As a result, when an output 502 from the comparator 501 indicates a "too dark" judgement when the specific period is completed, since the pedestal level input to the A/D converter 115 is slightly increased, the luminance signal level input thereto is also increased, thus forming a feedback loop to moderate the "too dark" state.

On the contrary, when an output 503 from the comparator 501 indicates a "too bright" judgement, the pedestal level is decreased and the feedback loop is formed to moderate the "too bright" state, thus automatically controlling the pedestal level.

In FIG. 7, when a smoothing circuit consisting of a resistor, a capacitor, and the like is inserted between the pedestal level clamp switch 113 and the node between the first and second switches 404 and 408 to weaken the auto-pedestal level clamp function, this arrangement is effective for small-amplitude composite video signals.

Note that when a control function is added to the first and second latch circuits so that the close timing of the first and second switches coincides with that of the pedestal level clamp switch, the pedestal level clamp switch can be omitted.

This can be considered a modification of this embodiment of the present invention.

When the most and least significant comparators of the A/D converter are used as luminance signal level detectors, data input to the A/D converter causes overflow and underflow, and the ratio of completely white display portions to completely black display portions becomes 1, thus allowing effective use of display apparatus contrast.

The clocks passing through the first and second gate circuits can be sampling clocks from the A/D converter or inverted clocks therefrom.

In order to finely adjust the pedestal level clamp function, a variable or fixed resistor is connected between the pedestal level clamp switch 113 and the node between the first and second switches 404 and 408 to control the DC potential (e.g., $V_{DD}$ or $V_{SS}$). In addition, when temperature characteristics of a liquid-crystal panel or the like are also taken into consideration, the above resistor can be selected so that a change in resistance thereof due to temperature corresponds to an optimal adjustment value. The circuit of this embodiment can be applied to a CRT display type television.

Figure 8:
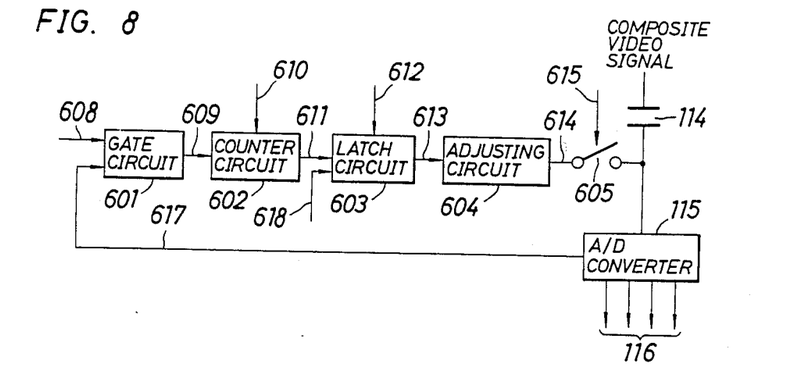
FIG. 8 is a block diagram of an auto-pedestal level clamp circuit according to a fourth embodiment of the present invention.

FIG. 8 is a block diagram of an auto-pedestal level clamp circuit according to a fourth embodiment of the present invention. Referring to FIG. 8, arrows indicate propagating directions of signals, and reference numeral 601 denotes a gate circuit which passes continuously input clocks (indicated by 608) therethrough when a luminance signal level is high; 602, a counter circuit which is initialized by a reset signal (indicated by 610) when a specific period for judging the total level of the luminance signal begins, and counts the clock outputs passing through the gate circuit 601 (indicated by 609) during the specific period; 603, a latch circuit for latching an "overall bright", "overall dark", or "neutral brightness" judgement as 2-bit output from the counter circuit 602 (indicated by 611) in response to a fetching clock (indicated by 618) when the specific period is completed; 604, an adjusting circuit for generating a DC potential based on the 2-bit output from the latch circuit 603 (indicated by 613); 605, a pedestal level clamp switch which is opened/closed by a pedestal level clamp pulse indicated by 615, and is connected to a DC potential 614 from the adjusting circuit 604; 114, a DC blocking capacitor; connected to the pedestal level clamp switch 605 and the input terminal of an A/D converter, for removing DC components from the input composite video signal; 115, a 4-bit A/D converter which A/D converts the input composite video signal and is used as a luminance level detector in this embodiment; 116, 4-bit quantized outputs from the A/D converter 115; 617, a comparator output supplied to the gate circuit 601 from the A/D converter 115 used as the luminance signal level detector; and 612, a control signal supplied to the latch circuit 603 so as not to operate the adjusting circuit 604 during the vertical blanking period.

Referring to FIG. 8, when the luminance signal includes many overflow portions and indicates "overall bright", the number of the clocks 608 passing through the gate circuit 601 is increased, and the outputs 609 input therefrom to the counter circuit 602 exceed two count values set for making an "overall dark" and "not overall dark" judgement during the specific period. The counter circuit 602 then makes an "overall bright" judgement, and the output result 611 is fetched by the latch circuit 603 when the specific period is completed. On the contrary, when the luminance signal includes many underflow portions and indicates an "overall dark" judgement, the number of clock outputs 609 having passed through the gate circuit 605 is decreased, and is below the two count values of the counter circuit 602 set for making an "overall bright" and overall dark" judgement during the specific period. In this case, the counter circuit 102 makes an "overall dark" judgement, and the output result 611 is latched by the latch circuit 603 when the specific period is completed. When the averaged luminance signal level is a neutral value and indicates "neutral brightness", the number of clock outputs 609 having passed through the gate circuit 601 exceeds the count value for making a "not overall dark" judgement but is below the count value for an "overall bright" judgement during the specific period. Thus, the counter circuit 602 makes a "neutral brightness" judgement, and the output result 111 is latched by the latch circuit 603 when the specific period is completed.

In FIG. 8, when the latch circuit 612 latches the output result 611 indicating an "overall bright" judgement made by counter circuit 602 in response to a fetching clock 618, the low voltage $V_{SS}$ as the output 614 of the adjusting circuit 604 is applied to the pedestal level clamp switch 605 in accordance with the output 613 from the latch circuit 603. As a result, when the pedestal level clamp switch 605 is closed in response to the pedestal level clamp pulse 615, charges are discharged from the DC blocking capacitor 114 in accordance with discharging characteristics of the circuit, thus decreasing the pedestal level of the composite video signal input to the A/D converter 115. On the contrary, when the latch circuit 603 latches the output 611 indicating an "overall dark" judgement from the counter circuit 602, since the adjusting circuit 604 generates the high potential $V_{DD}$ as its output 614, the pedestal level is increased. When the latch circuit 603 latches the output 611 indicating "neutral brightness" from the counter circuit 602, the output 614 from the adjusting circuit 604 has high impedance, and charge flow through the pedestal level clamp switch 605 is interrupted, thus keeping the pedestal level unchanged.

When the counter circuit 602 makes an "overall bright" judgement during the preceding specific period in FIG. 8, the pedestal level of the composite video signal input to the A/D converter 115 is slightly increased in the next period, and the luminance signal level input thereto is decreased accordingly, thus forming a feedback loop for approaching a "neutral brightness" state. On the contrary, in the case of an "overall dark" judgement, the pedestal level is controlled to approach the neutral state.

In this embodiment, when a smoothing circuit consisting of a resistor and a capacitor is connected to the input side of the pedestal level clamp switch 605 in the same manner as in the embodiment shown in FIG. 7, the feedback operation can be smoothed. As a result, since variations in pedestal level are moderated, this arrangement is effective for small-amplitude composite video signals.

The auto-pedestal level clamp circuit can be arranged using only "overall bright" and "overall dark" judgements without "neutral brightness" in the embodiment shown in FIG. 8. Thus, the 2-bit output 613 from the latch circuit 603 in FIG. 8 can be reduced to 1 bit, and the latch circuit 603 can be simplified. This enhances the feedback effect of the auto-pedestal level clamp operation.

In this embodiment, the clocks can easily pass through the gate circuit 601 when the luminance signal level is high, but the circuit can also be constituted such that the clocks pass therethrough when the luminance signal level is low.

Figure 9:
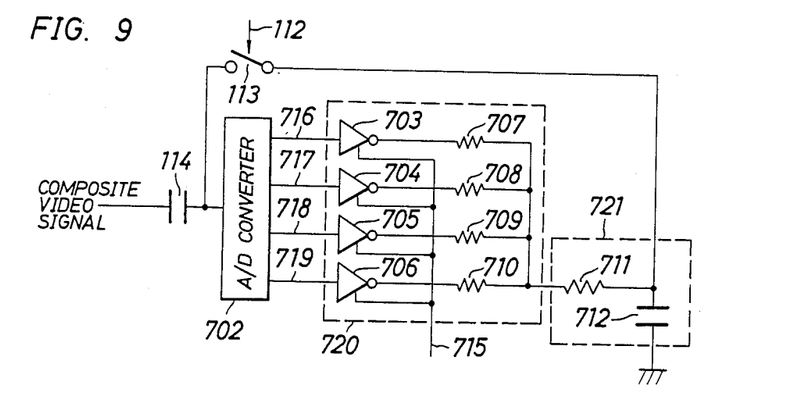
FIG. 9 is a block diagram of an auto-pedestal level clamp circuit according to a fifth embodiment of the present invention.

FIG. 9 is a block diagram of an auto-pedestal level clamp circuit according to a fifth embodiment of the present invention. Referring to FIG. 9, reference numeral 114 denotes a DC blocking capacitor for an input composite video signal; 702, a 4-bit A/D converter for A/D converting the composite video signal which has passed through the capacitor 114 and is pedestal-clamped; 703, 704, 705, and 706, 3-state buffers which perform an inverter operation during a luminance signal period of the composite video signal; 707, 708, 709, and 710, resistors having resistances determined in accordance with weighting according to the output from the A/D converter 702; 711, a resistor for a smoothing circuit; 712, a capacitor for the smoothing circuit; 113, a pedestal level clamp switch; 112, a pedestal level clamp pulse for opening/closing the pedestal level clamp switch 113; 715, a signal for controlling the inverter operation output from the 3-state buffers 703, 704, 705, and 706 and high-impedance output; and 716, 717, 718, and 719, $2^3$-, $2^2$-, $2^1$-, and $2^0$-bit outputs from the A/D converter 702. The circuit surrounded by dotted line 720 is an inversion weighting circuit, and the circuit surrounded by dotted line 721 is a smoothing circuit.

Referring to FIG. 9, assuming that the resistance of the resistor 707, connected to the output of the 3-state buffer 703 to which the $2^3$-bit output 716 from the A/D converter 702 is input, is $R\Omega$, the resistances of the resistors 708, 709, and 710, respectively connected to the outputs of the 3-state buffers 704, 705, and 706 to which the $2^2$-, $2^1$-, and $2^0$-bit outputs 717, 718, and 719 are input, are weighted to be $2R\Omega$, $4R\Omega$, and $8R\Omega$, respectively, thus constituting an adder circuit. Therefore, the signal input to the smoothing circuit 721 corresponds to an inverted, D/A converted signal of the composite video signal input to the A/D converter 702 during the inverter operation of the 3-state buffers 703, 704, 705, and 706.

Referring to FIG. 9, when the luminance signal level is high (i.e., in a bright frame), the input signal of the smoothing circuit 721, which is substantially the same as an inverted luminance signal, includes many low potential portions, and the output voltage from the smoothing circuit 721 is decreased. For this reason, when the pedestal level clamp switch 113 is closed, charges flow from the DC blocking capacitor 114 into the smoothing circuit 721, and the pedestal level of the composite video signal input to the A/D converter 702 is decreased. On the other hand, in a dark frame (i.e., low luminance signal level), the input signal of the smoothing circuit 721, which is substantially the same as the luminance signal input to the A/D converter 702, includes many high potential portions. Therefore, the output from the smoothing circuit 721 is increased, as is the pedestal level. In FIG. 9, when charging/discharging of the DC blocking capacitor 114 is performed several times, the output from the A/D converter 702 causes the input signal to be negatively fed back through the inversion weighting circuit 720, the smoothing circuit 721, and the pedestal level clamp switch 113. Then, the pedestal level can be stabilized to darken the bright frame or to brighten the dark frame.

In FIG. 9, as D/A conversion precision of the input signal of the smoothing circuit 721 becomes more coarse, the resistors 710, 709, and 708 can be omitted in this order, and an equivalent pedestal level clamp function can be provided. In this case, however, since controllability of the feedback amount suffers, the time constant of the smoothing circuit 721 must be increased.

Figure 10:
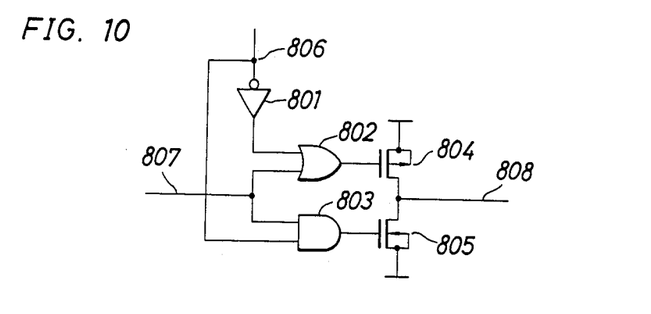
FIG. 10 is a circuit diagram of a 3-state buffer used in an inversion weighting circuit of the fifth embodiment shown in FIG. 9.

FIG. 10 is a circuit diagram of the 3-state buffer used in the inversion weighting circuit of the above embodiment. Referring to FIG. 10, reference numeral 801 denotes an inverter; 802, an OR gate; 803, an AND gate; 804, a P-MOSFET; and 805, an N-MOSFET. In addition, reference numeral 806 denotes a signal which goes to HIGH level when the 3-state buffer performs the inverter operation during, e.g., the luminance signal period, and goes to LOW level when the 3-state buffer produces the high-impedance output in the horizontal or vertical blanking period; 807, an input terminal receiving the digital outputs 716, 717, 718, and 719 from the A/D converter 702 in FIG. 9; and 808, an output. A period during which the 3-state buffer produces the high-impedance output corresponds to vertical and horizontal blanking periods of the composite video signal. Since pedestal level control is not influenced by a sync signal and the like except for the luminance signal, a good frame can be obtained.

The present invention has been exemplified by way of various embodiments. However, the present invention is not limited to these particular embodiments, and various changes and modifications may be made within the spirit and scope of the invention.

What is claimed is:

1. An auto-pedestal level clamp circuit, which clamps a pedestal level of a television signal input through a DC blocking capacitor using a pedestal level clamp switch to automatically adjust the pedestal level of the television signal, comprising:

level detecting means for detecting a luminance signal level of the clamped television signal, said level detecting means comprising an A/D converter for converting the luminance signal into a digital signal; and judging means for judging a luminance of a frame based on the output from said level detecting means, said pedestal level clamp switch having means to adjust the pedestal level of the television signal input to said level detecting means based on an integral potential level of the output from said judging means.

2. An auto-pedestal level clamp circuit according to claim 1, characterized in that said level detecting means comprises a comparator incorporated in said A/D converter for converting the luminance signal into the digital signal.

3. An auto-pedestal level clamp circuit according to claim 2, characterized in that said comparator comprises a first comparator for judging overflow and a second comparator for judging underflow.

4. An auto-pedestal level clamp circuit according to claim 1, characterized in that said judging means judges the luminance of the frame based on two different outputs from said A/D converter.

5. An auto-pedestal level clamp circuit according to claim 1, characterized in that said judging means comprises first and second switches, said first and second switches being closed in accordance with the output from said level detecting means, and said first and second switches each being connected to a DC source to thereby supply a DC voltage when closed.

6. An auto-pedestal level clamp circuit according to claim 1, characterized in that said judging means comprises means to switch its output off during horizontal and vertical blanking periods of the television signal, said judging means thereby having a high output impedance when switched off.

7. An auto-pedestal level clamp circuit according to claim 1, characterized in that said judging means comprises first and second gate circuits for controlling passage of clocks based on said level detecting means; first and second counter circuits for respectively counting the outputs from said first and second gate circuits; first and second latch circuits for respectively latching the outputs from said first and second counter circuits; and first and second switching means which are opened/closed based on the outputs from said first and second latch circuits, respectively.

8. An auto-pedestal level clamp circuit according to claim 1, characterized in that said judging means comprises first and second gate circuits for controlling passage of clocks based on said level detecting means; first and second counter circuits for respectively counting the outputs from said first and second gate circuits; a comparator circuit for comparing the outputs from said first and second counter circuits; a latch circuit for latching the output from said comparator circuit; and switching means which is opened/closed by the output from said latch circuit.

9. An auto-pedestal level clamp circuit according to claim 1, characterized in that said judging means comprises a gate circuit for controlling passage of clocks based on the output from said level detecting means; a counter circuit for counting the output from said gate circuit; a latch circuit for latching the output from said counter circuit; and an adjusting circuit operated by the output from said latch circuit.

10. An auto-pedestal level clamp circuit according to claim 1, characterized in that said judging means is a weighting circuit for performing inversion weighting adding of the output from said A/D converter.

11. An auto-pedestal level clamp circuit for automatically adjusting and clamping a pedestal level of a television signal, said circuit including means to detect the luminance level of said television signal, said luminance level detection means comprising means to determine when said luminance level is below a pre-determined minimum and above a pre-determined maximum, including a plurality of comparators, a first one of said comparators having means to define the pre-determined minimum, and a second one of said comparators having means to define the pre-determined maximum, means responsive to said luminance level detection means to automatically adjust and clamp the pedestal level of said television signal when said luminance level is outside said pre-determined minimum and maximum, and said detection means further includes means to convert the television signal into a digital signal comprising an A/D converter, said digital signal being input to the adjusting and clamping means.

* * * * *